Patented July 20, 1926.

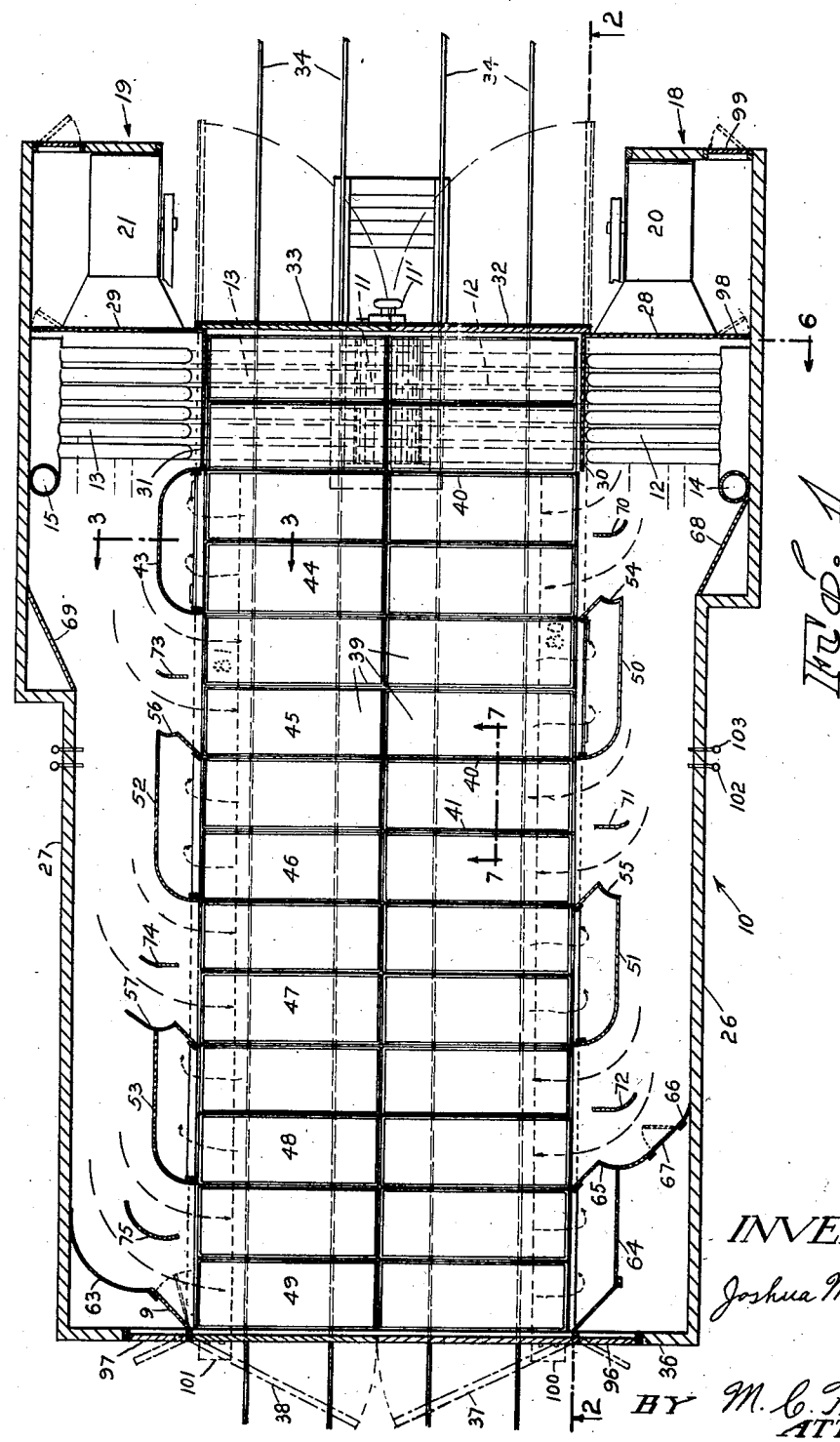

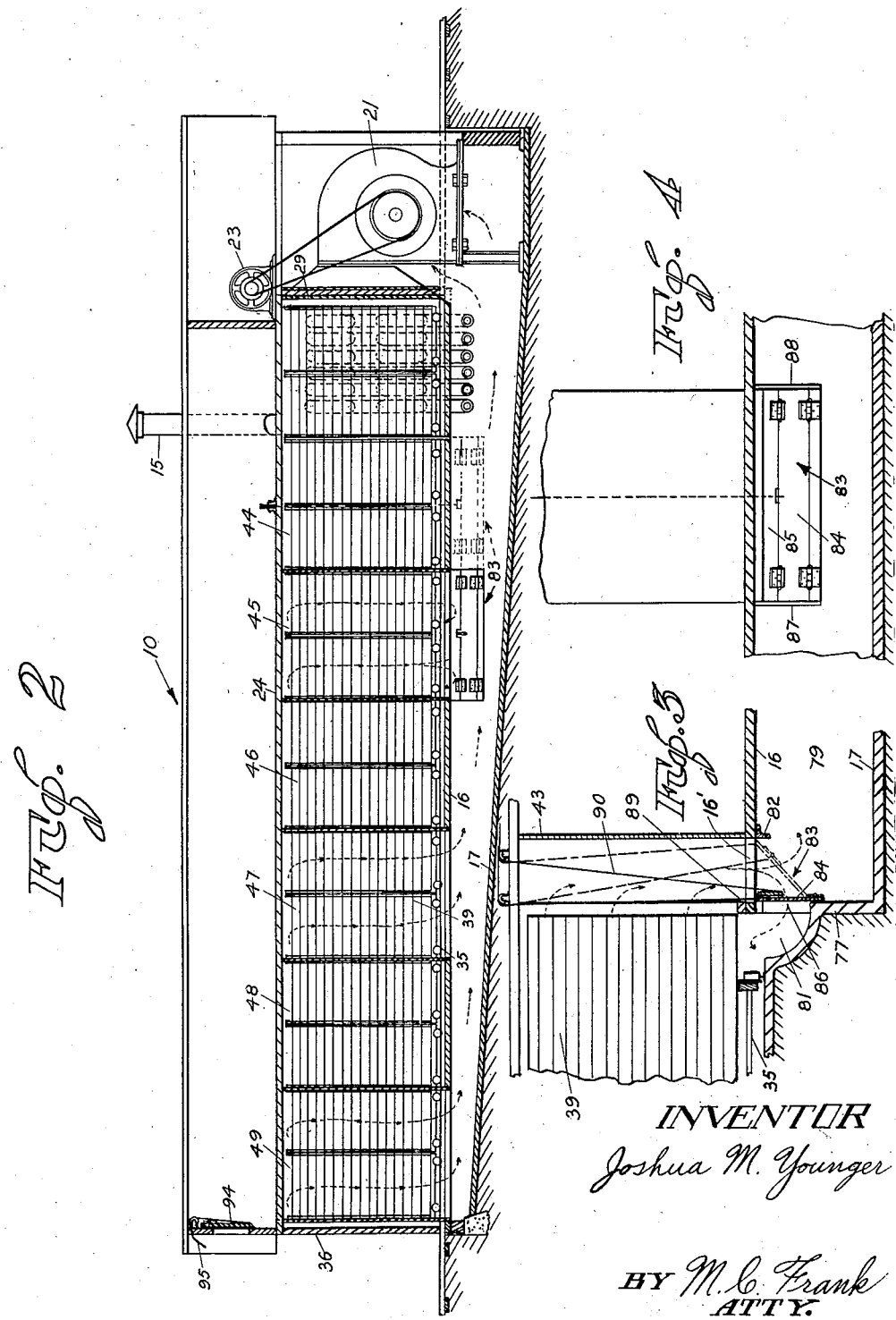

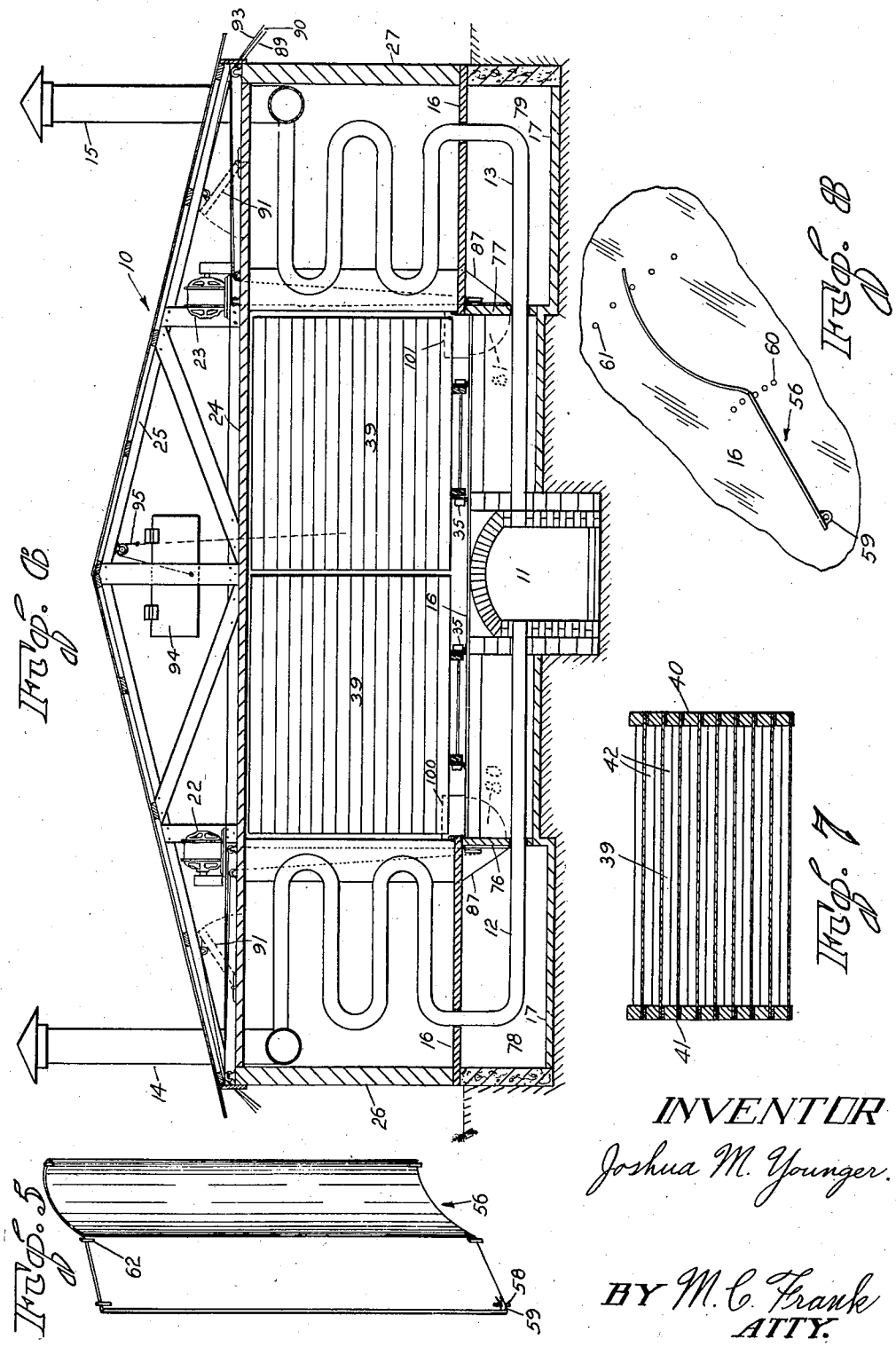

1,593,378

UNITED STATES PATENT OFFICE.

JOSHUA M. YOUNGER, OF OAKLAND, CALIFORNIA.

DEHYDRATOR.

Application filed November 3, 1925. Serial No. 66,455.

My invention relates to dehydrators, in which the water is removed from fruit or other food products by the continuous circulation of heated air through the dehydrators, and it has special reference to an apparatus in which the dehydrating process is accomplished with maximum efficiency in a minimum space of time and expense.

In dehydrators hitherto constructed, the humid air is carried a comparatively long distance so that the food product is partially cooked and has a tendency to change its natural color to a darker color or to become streaked in appearance. Although such a change of color in most cases does not affect the edibility of the product, nevertheless, the appearance of the product, after the product has gone through the drying process in former dehydrators, is liable to make a buyer doubtful of its quality, and it will therefore detract from the market value of the product.

Also, in order to carry out the drying process on a scale that would make the process comparatively economical, dehydrators up to the present time have comprised large structures, the erection of which has entailed a considerable expense.

It is a paramount feature of my invention to construct a dehydrator of a size and in such a way that the humid air has but a comparatively short distance to travel, and to subject the food product in the dehydrator to an intital sweating process for the purpose of quickly driving out a great percentage of the moisture from the product, and thereafter to subject it to a slow and uniform tempering and drying process adapted to minimize the liability to overheating or cooking of the product.

A further important object is to provide exhaust means direct to the atmosphere after the initial sweating process for the over-humid air resulting therefrom.

Another object is to provide means whereby the heated air in the dehydrator is continually mixed by a crisscrossing system of driven air.

Another important feature of the invention is to accomplish the dehydrating process in such a manner that the natural color of the food product therein is retained.

A further object of the invention is to provide means for quickly regulating the temperature of the air circulating through the dehydrator, and to provide means for carrying the humid air away therefrom during the drying process.

Other objects and advantages of my invention will be understood from the following detailed description taken in connection with the accompanying drawings, in which:

Figure 1 is a sectional plan of a dehydrator constructed in accordance with the principles of my invention;

Fig. 2 is a vertical section taken on line 2—2 in Fig. 1;

Fig. 3 is an enlarged vertical, fragmental section taken on line 3—3 in Fig. 1, and shows one of the exhaust doors for controlling the emission of over-humid air from the dehydrator, the door being shown in section as closed and in dot-and-dash lines as open, and the door-operating ropes in full lines for the closed door and in dot-and-dash lines for the door when open;

Fig. 4 is a side view of Fig. 3, and shows the exhaust control door open for the emission of over-humid air;

Fig. 5 is an enlarged perspective view of one of the adjustable baffles, and shows the pivotal means therefor and the pins adapted to engage the floor and the ceiling of the dehydrator for holding the baffle in place;

Fig. 6 is an enlarged sectional elevation, taken on line 6—6 in Fig. 1;

Fig. 7 is an enlarged transverse section of a number of trays stacked one on top of the other, the view being taken on line 7—7 in Fig. 1, to primarily show the air-circulating space between the trays; and Fig. 8 is a plan of the adjustable baffle shown in Fig. 5, and a fragmental plan of the floor upon which the baffle rests and shows the pin-engaging holes in the floor.

A detailed description of the invention follows:—

In the preferred embodiment of my invention the dehydrator comprises a structure 10 which is at its front end provided with a furnace 11 having a heating element 11'; preferably of a suitable oil burner type, and at the sides of the furnace are arranged winding radiator tubes 12 and 13, which connect with smokestacks 14 and 15 for leading the products of combustion from the heating element to the atmosphere.

The structure 10 is provided with a virtually level upper floor 16 extending from the front to the rear of the structure, and a lower floor 17, which preferably slopes from the rear to the front of the structure. On the sides of the structure, at the front thereof, are wings 18 and 19, in which are respectively mounted on the lower floor 17 blowers 20 and 21, adapted to be driven, in this instance, by electric motors 22 and 23, which are mounted above the ceiling 24 and under the roof 25 of the structure.

The side walls 26 and 27 of the structure are preferably offset, so that the width of the structure 10 is somewhat greater at the front than at the rear, and in front of the radiator tubes 12 is a wall 28, which extends from the floor 16 to the ceiling 24, and a similar wall 29 extends in front of the radiator tubes 13. Walls 30 and 31, Fig. 1, reaching from the floor 16 to the ceiling 24, join respectively the walls 28 and 29 and extend rearwardly therefrom in proximity to the respective windings of the radiator tubes 12 and 13 in order to be heated thereby, and doors 32 and 33 are hinged to the respective walls 28 and 29 and are adapted normally to close the front part of the structure between the floor 16 and the ceiling 24.

Two pairs of tracks 34 are secured to the floor 16 and extend longitudinally through the structure and a suitable distance outside thereof, so that trucks 35 may be rolled thereon into the structure through the front opening, normally closed by the doors 32 and 33, and out of the structure through an opening in the rear wall 36, which opening is normally closed by doors 37 and 38, hinged to the rear wall so as to open outwardly in similarity to the front doors.

Adapted to be placed in tiers upon the trucks 35 are trays 39, which are so formed and constructed, as is best shown in Fig. 7, that, when piled upon the trucks, they form a continuous wall towards the front as at 40, and a continuous wall towards the rear as at 41, upon each truck, but have their ends cut down so as to leave an open space 42 endwise between each two trays. The trays may thus be piled to the ceiling 24 without interfering with the free circulation of air over and under each tray. It is only necessary to observe that the trays are not piled to such a height as will interfere with the free movement of the trucks upon the tracks 34. The structure 10 is shown in the drawings as having a capacity of holding fourteen trucks with their respective piles of trays on each track, but it is obvious that the structure may be built to accommodate a larger or a smaller number according to the desired requirements.

The trays and the trucks are of such dimensions, and the tracks 34 are so placed, that they allow the trucks with their trays on one pair of tracks to pass the trucks with their trays on the other pair of tracks, or so that a truck on one pair of tracks may stand alongside of a truck on the other pair of tracks, and that the walls 40 and 41 thus virtually extend from one pair of tracks to the other. In the arrangement shown in Figs. 1, 2 and 6, four trucks can be placed within the closure which is formed by the walls 30 and 31, the front wall comprising the front doors 32 and 33, the floor 16 and the ceiling 24. This closure permits of no circulation of air therein, and this restriction causes "sweating" of the fruit or other food products during the operation of the oil burner 11'. For the purpose of further description I shall therefore refer to the closure as the sweating chamber. A removable wall or roll partition may be placed rearwardly of the trays in the sweating chamber for the first insertion of the day in order to shut off the outside air from the chamber during the sweating process for the said insertion, but a showing of such a wall is not deemed necessary, as the front walls 40 of the piled trays 39 in actual practice virtually also serve as a removable rear wall for the sweating chamber. It is also obvious that only one truck with its trays on one pair of tracks may stand alongside of a truck on the other pair of tracks anywhere in the sweating chamber, and the sweating process will be effective on the product placed on the two piles of trays in a similar manner as with four piles of trays.

Adjoining the wall 31 and extending from the floor 16 to the ceiling 24, is another wall 43, preferably made of sheet metal and curved at its side edges. This wall 43 extends rearwardly a distance approximately equal to that of the width of the wall 31, so that four trucks with their trays may be placed rearwardly of the four trucks in the sweating chamber and form a distinct compartment 44, which extends transversely of the structure 10 and is closed at one end by the wall 43 but is open at its opposite end. Five more compartments, Fig. 2, 45, 46, 47, 48 and 49 are formed in the structure in a similar manner, with the difference that the compartments 45, 47 and 49 are open toward the side wall 27 of the structure, while the compartments 46 and 48, in similarity with the compartment 44, are open toward the side wall 26.

In the compartments 45 and 47 the ends toward the side wall 26 are provided with respective walls 50 and 51, and in the compartments 46 and 48 the ends toward the side wall 27 have respectively similar walls 52 and 53 joined thereto. All the walls 50, 51, 52 and 53, which are preferably made of sheet metal, extend from the floor 16 to the ceiling 24, and the walls have forward thereof respective sheet metal baffles 54, 55, 56 and 57, all of which also extend between the floor and the ceiling and are pivotally secured thereto by pins 58 in engagement with openings in lugs 59, Figs. 5 and 8, at the inner ends of the baffles and with similar registering openings in the floor and the ceiling. The floor 16 and the ceiling 24 are also provided with sets of openings 60 and 61, and pins 62 are adapted to engage with the openings in order to hold the baffles tightly to the walls, so that the walls 50, 51, 52 and 53 may be considered as units with their respective baffles 54, 55, 56 and 57. It may be observed that the baffles 54 and 56 are similar in shape but reversed in position, and the baffle 57 is of a shape similar to that of the baffle 56, but extends farther sidewise into the air chamber. The baffle 55 is similar to the baffle 54.

At the open end of the compartment 49 and in the air chamber is a door 9, preferably made of sheet metal and pivotally connected with the inside of the rear wall 36 of the structure 10 so as to open inwardly toward the end of the compartment 49, and to close so as to form an extension of a baffle wall 63 which is also preferably of metal and is secured in the structure at its side wall 27. Both the door 9 and the baffle wall 63 reach from the floor 16 to the ceiling 24 in similarity to the other baffles already described. At the other end of the compartment 49, a wall 64 formed with an obtuse-angled bend therein and extending between the floor 16 and the ceiling 24, is joined to the rear wall 36. Extending between the floor and the ceiling and pivotally secured thereto and held tightly to the wall 64 in a manner similar to that of the baffles 54, 55, 56 and 57, is a metal baffle 65, and another metal baffle 66, similarly extending and joined to the side wall 26, has in hinged relation thereto a metal door 67 which is normally closed, so that the door 67 and the baffle 66 practically form extensions of the baffle 65. This door is adapted to open into the other side air chamber.

Deflecting metal plates 68 and 69, also extending between the floor and the ceiling, are respectively provided at the offset parts of the side walls 26 and 27, and metal baffle plates 70, 71, 72, 73, 74 and 75, similarly extending, are respectively provided forward of the baffles 54, 55, 65, 56, 57 and 63, and slightly forward of the middle of the respective compartments 44, 45, 46, 47, 48 and 49. The baffle plates 70, 71 and 72 are further arranged so that the outer edge of the plate 70 is virtually in alignment with the wall 50, while the baffle plate 71 extends a little farther toward the side wall 26, and the baffle plate 72 extends still farther toward the side wall 26. On the other side of the compartments the outer edge of the baffle plate 73 is virtually in alignment with the wall 52, while the baffle plate 74 extends a little farther toward the side wall 27, and the baffle plate 75 extends still farther toward the side wall 27, all for the purpose of deflecting substantially equal volumes of air through the respective compartments.

Under the floor 16 are two walls 76 and 77, Fig. 6, which extend longitudinally throughout the structure 10, so that on one side of the structure a return air duct 78, communicating with the air intake for the blower 20, is formed by the upper floor 16, and lower floor 17, the end wall 36, the side wall 26 and the wall 76. Another return air duct 79, communicating with the air intake for the blower 21, is similarly formed on the other side of the structure by the upper floor 16, the lower floor 17, the end wall 36, the side wall 27 and the wall 77.

In the floor 16 are openings 16' Fig. 3 conforming with the respective walls 43, 50, 52, 51, 53 and 64, so that with the trucks and the trays in the compartments, virtually vertical ducts are formed whereby the compartments 44, 46 and 48 communicate with the intake to blower 21 through the return air duct 79, while the compartments 45, 47 and 49 in a similar manner are provided with virtually vertical ducts whereby they communicate with the intake to blower 20 through the return air duct 78.

For the discharge of the over-humid air from the sweating chamber, the floor 16 throughout the length of the dehydrator and rearward from the sweating chamber, is recessed at each of the walls 76 and 77, Fig. 3, so as to form two longitudinal channels 80 and 81, and in each of the ducts 78 and 79 at an opening 16' for one of the compartments, which in this instance are shown in Fig. 2 as the compartments 44 and 45, I provide a member 82, cross-sectionally shown as an angle bar, which is adapted to serve as a stop for a door comprising two members 84 and 85. In the compartment 44 the door member 84 is hinged to the wall 77 and forms a closure in the wall for an opening 86 leading to the channel 81, and the other member 85 is hinged to the member 84 and adapted to abut against the stop 82 with its free edge. Both members 84 and 85 move freely between end walls 87 and 88, and, when the door is in the abutting position, as shown in dot-and-dash lines in Fig. 3, in conjunction with the end walls 87 and 88, serve as means for preventing communication of the compartment 44 with the return air duct 79, and at the same time serve as means whereby the compartment communicates with the channel 81. On the contrary, when the door is in the vertical position, as shown in section, the compartment's communication with the channel 81 is thereby prevented but its communication with the duct 79 is effected. An operating rope 89 is attached to the upper edge of the member 84, and another operating rope 90 is attached to the free edge of the member 85, and the ropes 89 and 90 pass through openings in the ceiling 24 and over pulleys and thence outside of the wall 27, so that the shifting of the door from one position to the other is easily accomplished from the outside of the structure 10. The parts here described in connection with the compartment 44 are similarly constructed and arranged and involve a similar operation in regard to the compartment 45, so that a separate description thereof is unnecessary. These two compartments are chosen for the location of the exhausts, as the more humid air is thereabouts, especially compartment 44 next to the sweating chamber.

In the ceiling 24, at convenient places between the walls 26 and 27 and the compartments, are air inlet openings provided with doors 91, Fig. 6, which are hinged to the ceiling, and the opening and closing of the doors is effected by ropes 93 passing over pulleys to the outside of the structure. Another door 94, hinged at its upper edge, is similarly provided for the main fresh air inlet opening in the rear wall 36, and the opening and closing of the door is also effected by a rope 95 passing over a pulley to the outside of the structure.

The rear wall 36 also has doors 96 and 97, adapted to open so as to effect communication from the outside with the air chambers between the compartments and the respective walls 26 and 27. The wing 18 is also provided with inside and outside openings, closed by respective hinged doors 98 and 99, which are adapted to open so as to effect communication with the interior of the wing both from the air chamber between the compartments and the wall 26 and from the outside of the structure 10. Similarly located openings having similarly hinged doors therefor are also provided in the wing 19. In the doors 37 and 38 of the rear wall 36, are small doors 100 and 101 directly opposite the channels 80 and 81 for the exit of the exhausts through the said channels.

For convenience, a thermometer 102 and a hygrometer 103 are placed outside of each of the walls 26 and 27 and are connected with the interior of the structure in order to enable the operator to observe the temperature and humidity of the air passing through the dehydrator.

In practice, the operation of my dehydrator is as follows: When the furnace 11 is functioning, trucks, holding the trays of fruit or other food product thereon, are rolled into the sweating chamber; the doors 32 and 33 are then closed, and the sweating process, which immediately begins, is allowed to continue during a length of time best adapted for the particular food product on the trays. Since no outside air, to any noticeable degree, can enter the sweating chamber during this time, it is seen that the sweating process tends to drive out a great percentage of the moisture in the food product, whether it be prunes, pears, figs, or any other of the numerous food products that are adapted to be placed on the market in a dehydrated state.

The front doors are then opened and the trucks in the sweating chamber are moved to the compartment 44. Another set of trucks with trays of the food product is then rolled into the sweating chamber and the electric motors started for the blowers. Then the air heated by the radiating tubes will be blown against the deflecting plates and the baffles and thence into and through the compartments and carried downwardly through the vertical ducts and the openings 16' and into the return air ducts, from which the air is returned to the respective intake of the other blower and circulated as before. When the food product on the next set of trays has gone through the sweating process, the set of trays that has just been in the compartment 44 is moved rearward to the compartment 45 while another set is rolled into the sweating chamber. When all compartments are thus filled with trays, it will be observed that the air will crisscross many times and will strike against the respective baffles and circulate over and under all the trays, and the trucks carrying the trays.

If, during the operation, the hygrometers show that the air is over-humid, the operator pulls the rope 90 for the door 83 and thereby prevents communication of the compartment with the return air duct, and in its stead establishes communication between the compartment and the respective channel to the atmosphere. When at any time air is forced out of the structure it is also necessary to open the doors 91 and 94 in order to let fresh air enter and fill the partial vacuum which is caused by the rapid expulsion of air from the structure.

Having thus described my invention and desiring to secure Letters Patent of the United States therefor, I claim as new the following:

1. In a dehydrator, means for heating the air in said dehydrator; means for moving food products into and out of the dehydrator; and a chamber heated by said heating means for causing said products to go through an initial sweating process for removing a great percentage of the moisture from said products.

2. In a dehydrator, a sweating chamber at one end thereof, said sweating chamber being adapted to hold food products therein; means for virtually excluding the outside air from the sweating chamber; and means for heating the sweating chamber so that the food products therein are caused to go through an initial sweating process for the removal of a great percentage of the moisture from said products.

3. In a dehydrator comprising a structure, a sweating chamber at the front of the structure; means for moving food products into and rearward of said sweating chamber; compartments rearward of the sweating chamber, said compartments being adapted to have air circulated therethrough and to receive successively the food products from the sweating chamber; means for virtually excluding the outside air from the sweating chamber; means for heating the air circulating through the compartments and for heating the sweating chamber so that the food products therein are caused to go through an initial sweating process for the removal of a great percentage of the moisture from said products; and means for causing a continuous crisscross circulation through said compartments of the air heated by said heating means.

4. In a dehydrator comprising a structure provided with front and rear walls, side walls, a ceiling and an upper and a lower floor; a sweating chamber at the front of said structure, said sweating chamber having a normally closed front wall, side walls and a removable rear wall, and all of said walls for the sweating chamber extending from the upper floor to said ceiling; means for moving food products into and rearward of said sweating chamber; compartments rearward of the sweating chamber, said compartments being adapted to extend from the upper floor to said ceiling and to have air circulated therethrough and to receive successively the food products from the sweating chamber; means for heating the air circulating through the compartments and for heating the sweating chamber so that the food products therein are caused to go through an initial sweating process for the removal of a great percentage of the moisture from said products; and means for causing a continuous crisscross circulation through said compartments and below said upper floor of the air heated by said heating means.

5. In a dehydrator comprising a structure provided with front and rear walls, side walls, a ceiling and an upper and a lower floor; a sweating chamber at the front of said structure, said sweating chamber having a normally closed front wall, side walls and a removable rear wall, and all of said walls for the sweating chamber extending from the upper floor to said ceiling; means for moving food products into and rearward of said sweating chamber; compartments rearward of the sweating chamber, said compartments having open ends and being adapted to extend from the upper floor to said ceiling and to have air circulated therethrough and to receive successively the food products from the sweating chamber, and alternate compartments having end walls opposite to their open ends and extending between the upper floor and said ceiling toward the side of one of the side walls of said structure, while the other compartments have end walls also opposite their open ends and extending between the upper floor and said ceiling toward the side of the other side wall of said structure; baffles at the open ends of each compartment; means for heating the air circulating through the compartments and for heating the sweating chamber so that the food products therein are caused to go through an initial sweating process for the removal of a great percentage of the moisture from said products; and means for causing a continuous circulation through said compartments and below said upper floor of the air heated by said heating means.

6. In a dehydrator, means for heating the air in said dehydrator; means for moving food products into and out of the dehydrator; a chamber heated by said heating means for causing said products to go through an initial sweating process for removing a great percentage of the moisture from said products; and means for removing the over-humid air from said dehydrator.

7. In a dehydrator, comprising a structure, a sweating chamber at the front of the structure; means for moving food products into and rearward of said sweating chamber; compartments rearward of the sweating chamber, said compartments being adapted to have air circulated therethrough and to receive successively the food products from the sweating chamber; means for virtually excluding the outside air from the sweating chamber; means for heating the air circulating through the compartments and for heating the sweating chamber so that the food products therein are caused to go through an initial sweating process for the removal of a great percentage of the moisture from said products; means for causing a continuous crisscross circulation through said compartments of the air heated by said heating means; and means for removing the over-humid air from said structure.

8. In a dehydrator comprising a structure provided with front and rear walls, side walls, a ceiling and an upper and a lower floor; a blower mounted on each side of the structure; means for operating said blowers; a return air duct formed on each side of the structure by an inner wall, one of said side walls, said front and rear walls and said upper and lower floors, said return air duct communicating with the intake of the respective blower; two sets of compartments extending between the upper floor and the ceiling and transversely of the structure, each compartment having one end open above the upper floor and the other end provided with a virtually vertical duct, and the ducts at the compartments of one set communicating with the return air duct leading to one of said blowers, while the ducts at the compartments of the other set communicate with the return air duct leading to the other blower, so that air is thus forced to circulate alternatingly through and from one blower to and through the compartments of one set and to and through the other blower to and through the compartments of the other set; means for moving food products into said compartments and for retaining the food products therein and removing them therefrom; and means for heating the air during its circulation through said blowers, ducts and compartments.

In testimony whereof I affix my signature.

JOSHUA M. YOUNGER.